United States Patent [19]
Shen et al.

[11] Patent Number: 5,801,922
[45] Date of Patent: Sep. 1, 1998

[54] PORTABLE COMPUTER HAVING INSERTABLE MODULE CONTAINING EXPANSION UNITS AND CONNECTED TO A SOCKET SECURED ON THE MAINCIRCUIT BOARD

[75] Inventors: Wen-Chung Shen; Po-An Lin, both of Taipei, Taiwan

[73] Assignee: Compal Electronics, Inc., Taipei, Taiwan

[21] Appl. No.: 826,185

[22] Filed: Mar. 27, 1997

[51] Int. Cl.⁶ .................. G06F 1/16; H05K 7/10
[52] U.S. Cl. ........................... 361/686; 361/685
[58] Field of Search ...................... 361/684–686, 361/725–727; 364/708.1

[56] References Cited

U.S. PATENT DOCUMENTS 5,193,051  3/1993  Ma ............................ 361/685 X
5,195,022  3/1993  Hoppal et al. ................. 361/685
5,400,216  3/1995  Tsai ............................. 361/684
5,483,419  1/1996  Kaczeus, Sr. et al. ......... 361/685

*Primary Examiner*—Michael W. Phillips
*Attorney, Agent, or Firm*—Pro-Techtor Inter-National Services

[57] ABSTRACT

Multi-unit module of portable computer, including a computer housing and a module casing. At least two expansion units are inserted in the module casing as a module. At least one plug is disposed on one side of the module casing and connected to the expansion units. A module insertion slot is disposed on one side of the housing. An inner end of the insertion slot is disposed with at least one socket secured on the main circuit board corresponding to the plug of the module casing, whereby when the module casing is inserted into the insertion slot, the plug is connected with the socket so that the expansion units can be at the same located in the housing and drivingly connected with and controlled by the main circuit board.

3 Claims, 5 Drawing Sheets

PORTABLE COMPUTER HAVING INSERTABLE MODULE CONTAINING EXPANSION UNITS AND CONNECTED TO A SOCKET SECURED ON THE MAINCIRCUIT BOARD

BACKGROUND OF THE INVENTION

The Present invention relates to a multi-unit module of portable computer, including a computer housing and a module casing. At least two expansion units are inserted in the module casing as a module. At least one plug is disposed on one side of the module casing and connected to the expansion units. At least one socket is secured on the main circuit board for connecting with the plug of the module casing, whereby the expansion units can be at the same located in the housing and circuit board with using any connecting signal cable.

The conventional expansion units of portable computer, such as floppy disk drive, CD ROM drive, etc., are connected with the main circuit board by two ways, that is, fixed type and module type. With respect to the fixed type, the expansion units are simultaneously installed at different positions of the housing of the portable computer. According to such arrangement, it is impossible to further expand the function of the portable computer, such as a spare battery. With respect to the module type, as shown in FIG. 1, one side of the housing 31 of the portable computer is disposed with a module insertion slot 315 having a dimension substantially equal to that of a CD ROM drive 33, a floppy disk drive 32 or other expansion unit. The main circuit board 312 in the housing 31 is disposed with a first and a second sockets 313, 314 at the end of the module insertion slot 315. Correspondingly, the CD ROM drive 33 and the floppy disk drive 32 are respectively disposed with a first and a second plugs 331, 321, whereby when the CD ROM drive 33 and floppy disk drive 32 or other expansion units are inserted into the module insertion slot 315, the first and second plugs 331, 321 are respectively connected with the first and second sockets 313, 314. At this time, the main circuit board 312 can drive the CD ROM drive and floppy disk drive. Such measure is advantageous in that the computer can have small volume and can be variously expanded in function. However, only one expansion unit can be inserted into the insertion slot 315 at one time. In the case that several expansion units should be used at the same time, an additional connecting signal cable 34 must be used to connect the other expansion unit to an expansion port of the portable computer so as to simultaneously drive the several expansion units. Such connection will affect the original function of the expansion port of the portable computer. In addition, the expansion unit not inserted into the insertion slot 315 and the connecting signal cable 34 must be independently packed. This will lead to inconvenience in carriage.

Moreover, the existing central processor posesses the function of multidirectional signal searching. In the case that the device for setting the signal source is not connected, the central processor will stop during operation to search and identify the signal source device. This will increase the operation time and lower the data processing efficiency.

SUMMARY OF THE INVENTION

It is a primary object of the present invention to provide a multi-unit module of portable computer, including a computer housing and a module casing. At least two expansion units are inserted in the module casing as a module. At least one plug is disposed on one side of the module casing and connected to the expansion units. At least one socket is disposed at an inner end of a module insertion slot of the housing and secured on the main circuit board for connecting with the plug of the module casing, whereby the expansion units can be at the same located in the housing and drivingly connected with and controlled by the main circuit board with using any connecting signal cable.

It is a further object of the present invention to provide the above multi-unit module in which the expansion units along with the module casing can be located in the computer housing without being separately carried. The module casing can be drawn out as necessary, permitting other expansion units such as a second battery, modem, etc. to be inserted into the module insertion slot for expanding the function of the portable computer.

The present invention can be best understood through the following description and accompanying drawings, wherein:

DETAILED DESCRIPTION OF THE PREFERRED EMBODIMENT

Figure 1:
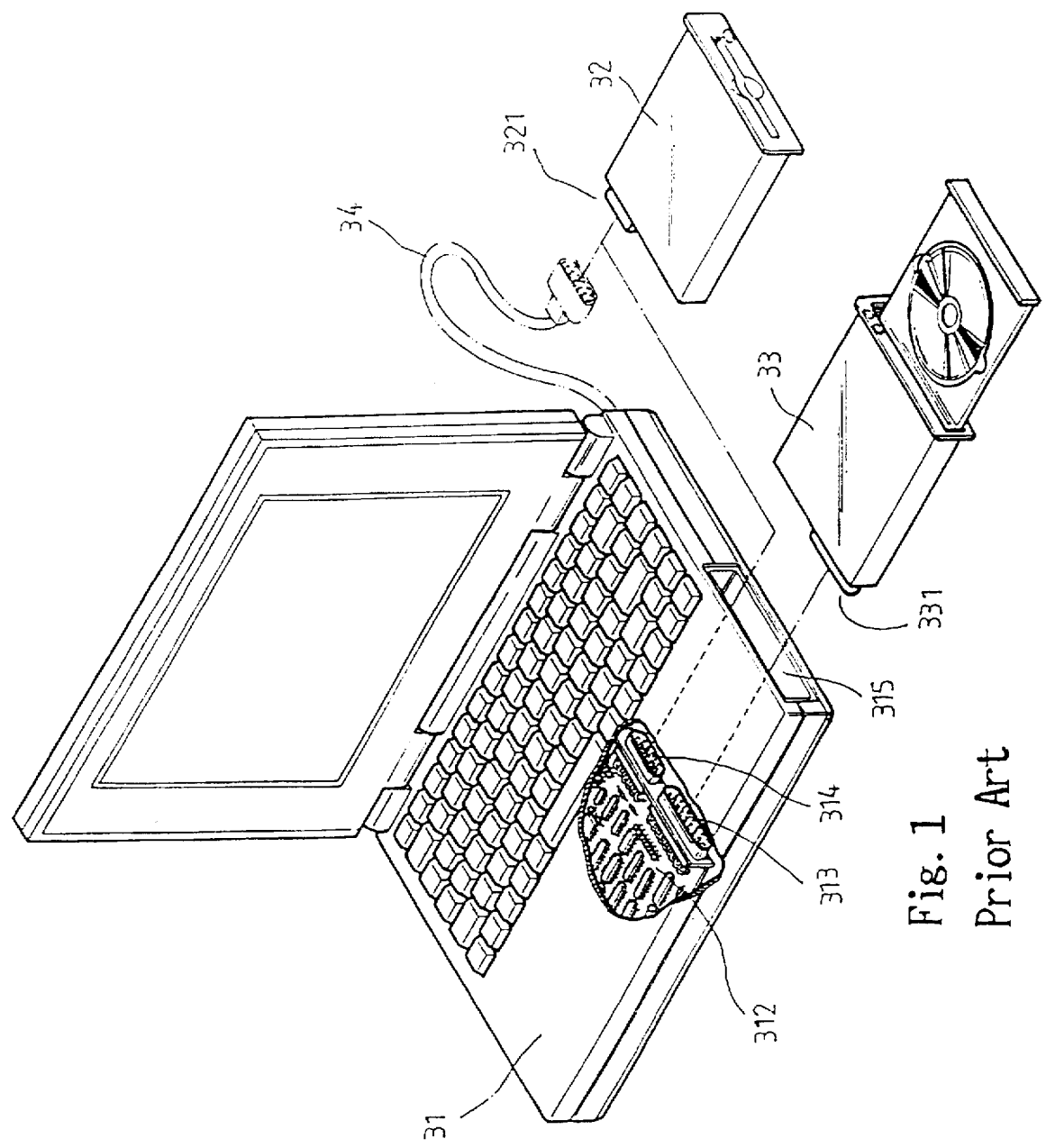
FIG. 1 is a perspective view showing the connection between the conventional module type expansion unit and the main circuit board of a portable computer.
Figure 2:
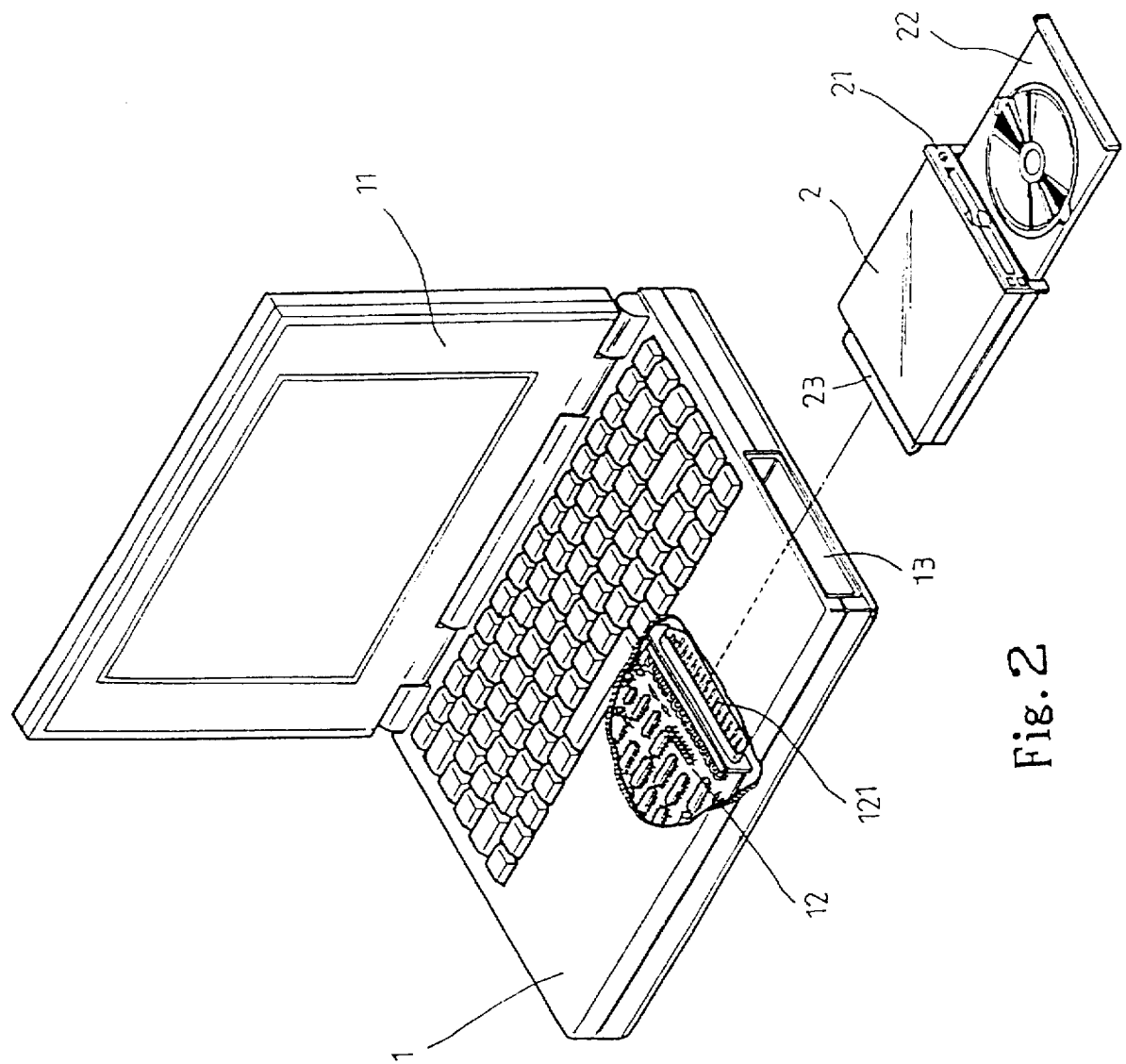
FIG. 2 is a perspective disassembled view of the present invention.
Figure 3:
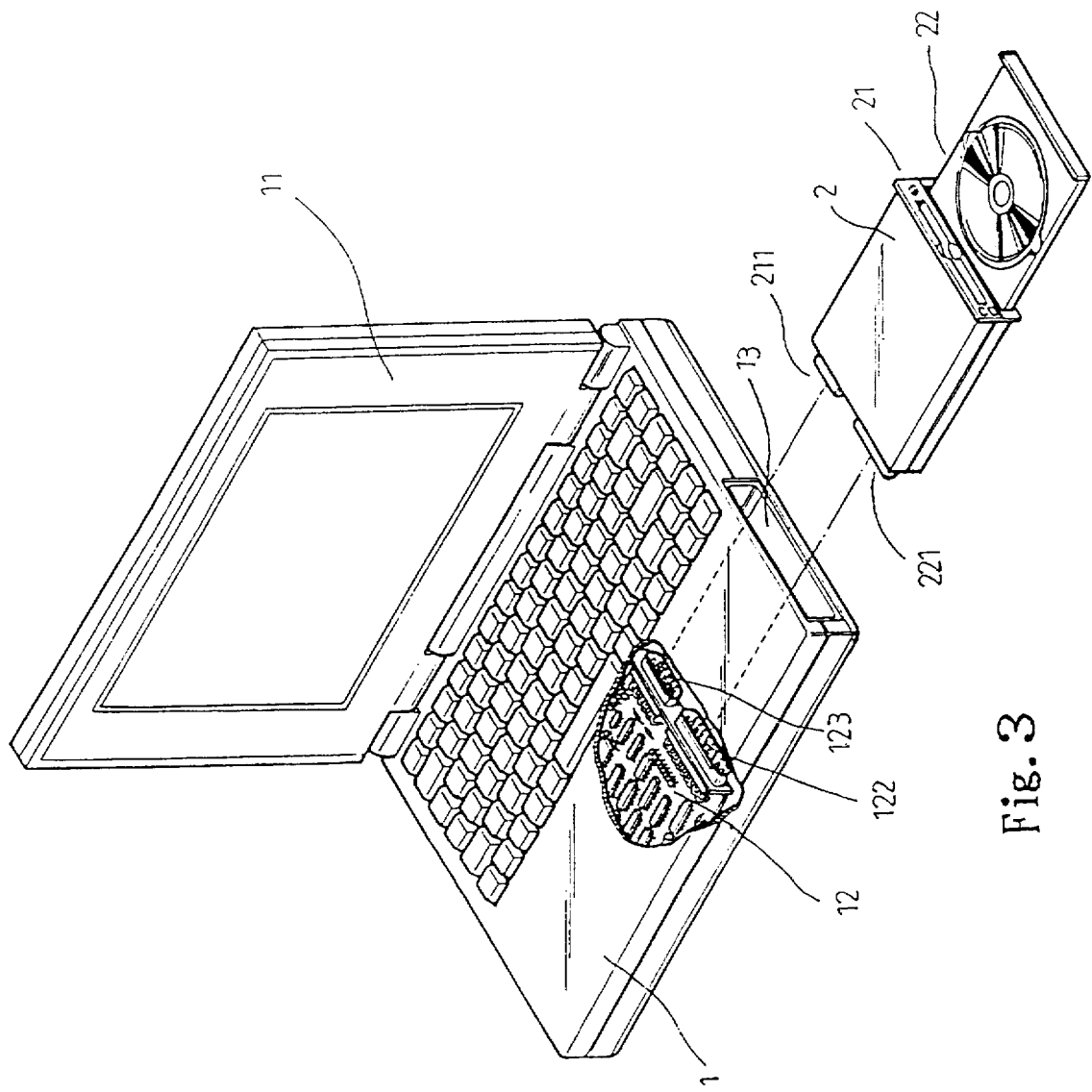
FIG. 3 shows another embodiment of the Plugs and sockets of the present invention.
Figure 4:
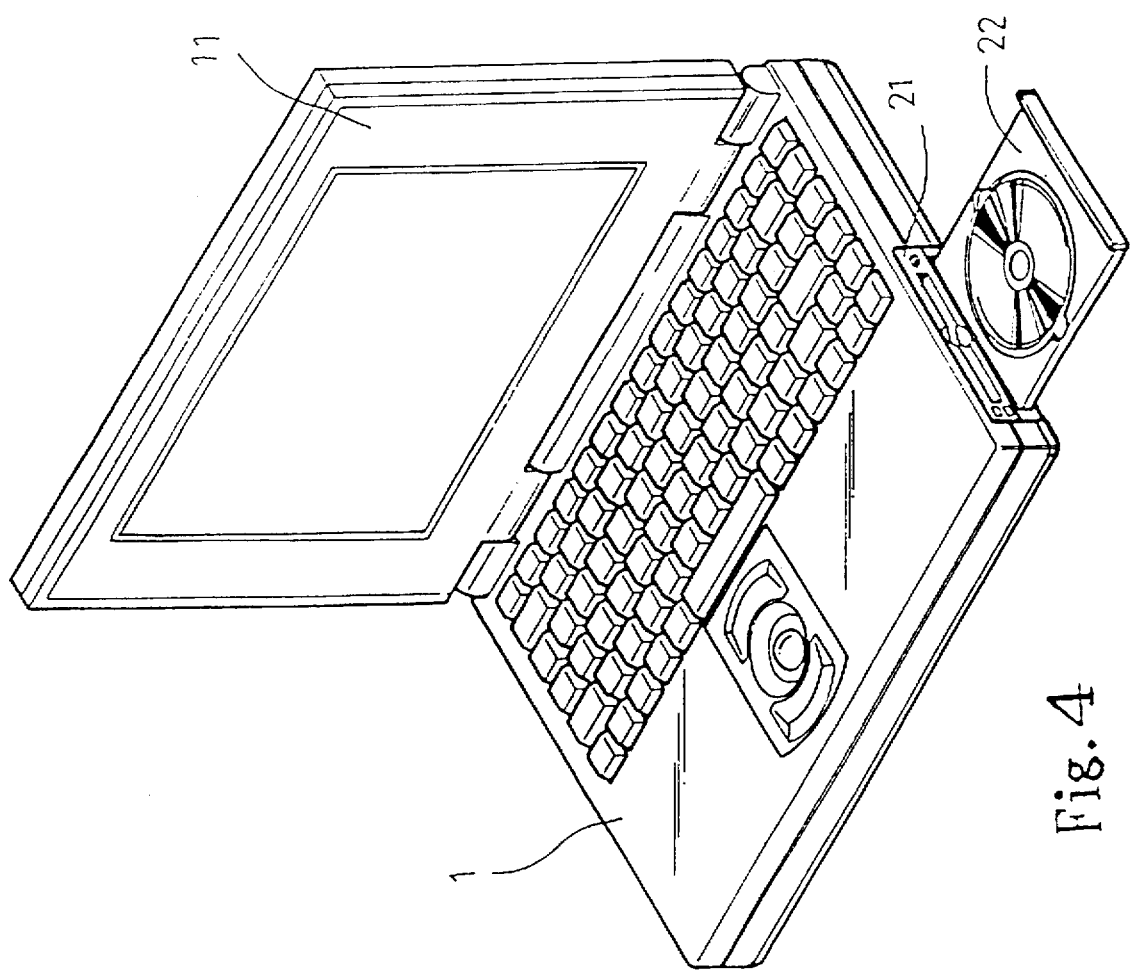
FIG. 4 is a perspective assembled view of the present invention.

Please refer to FIGS. 2 to 4. The present invention mainly includes a housing 1 and a module casing 2. The expansion units such as floppy disk drive 21 and CD ROM drive 22 can be inserted and stacked in the module casing 2. A main plug 23 is disposed on one side of the module casing 2 for the floppy disk drive 21 and CD ROM drive 22 to commonly use as shown in FIG. 2. Alternatively, the module casing is disposed with a first and a second Plugs 221, 211 respectively connected to the CD ROM drive 22 and floppy disk drive 21 as shown in FIG. 3. A screen 11 is pivotally disposed on the housing 1 and a module insertion slot 13 is disposed on one side of the housing 1. The inner end of the insertion slot 13 is disposed with a main socket 121 or a first and a second sockets 122, 123 secured on the main circuit board 12. When the module casing 2 is inserted into the insertion slot 13, the main plug 23 is connected with the main socket 121 or the first and second plugs 221, 211 are connected with the first and second sockets 122, 123. Accordingly, the floppy disk drive 21 and CD ROM drive 22 are located in the housing 1 and drivingly connected with and controlled by the main circuit board 12.

Figure 5:
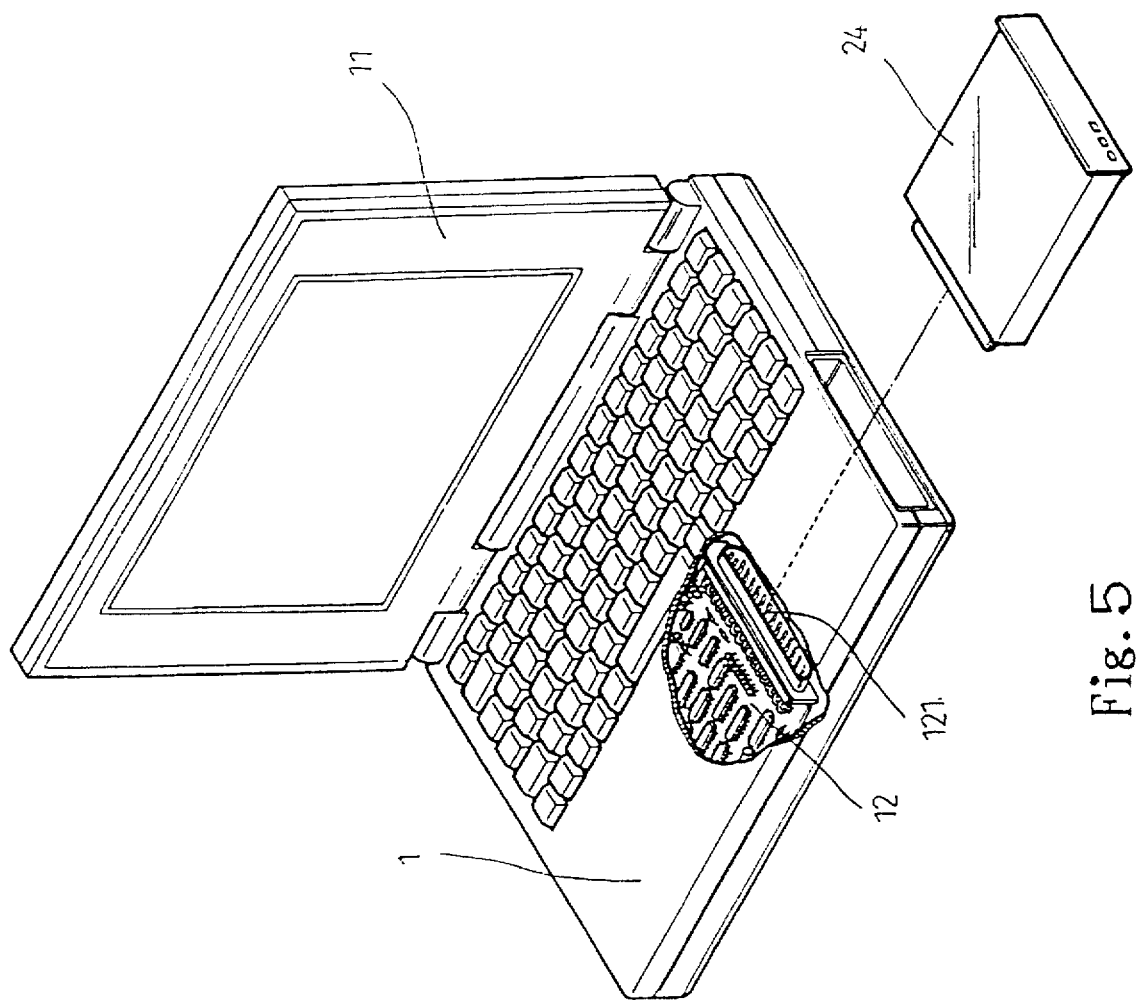
FIG. 5 shows another application of the present invention.

FIG. 5 shows another embodiment of the present invention, in which the module casing 2 can be drawn out as necessary, permitting another expansion unit such as a second battery 24 to be inserted into the insertion slot 13. Therefore, the expansion units can be replaced with another for different function.

It should be noted that the above description and accompanying drawings are only used to illustrate some embodiments of the present invention, not intended to limit the scope thereof. Any modification of the embodiments should fall within the scope of the present invention.

What is claimed is:

1. Multi-unit module of portable computer, comprising a computer housing and a module casing, wherein:

expansion units are inserted in the module casing, at least one plug being disposed on one side of the module casing and connected to the expansion units, a module insertion slot being disposed on one side of the housing, an inner end of the insertion slot being disposed with at least one socket secured on the main circuit board corresponding to the plug of the module casing, whereby when the module casing is inserted into the insertion slot, the plug is connected with the socket so that the expansion units as a module are located in the housing and drivingly connected with and controlled by the main circuit board.

2. Multi-unit module of portable computer as claimed in claim 1, wherein the expansion units are commonly connected to a main plug disposed on one side of the module casing and a main socket is secured on the main circuit board for connecting with the main plug.

3. Multi-unit module of portable computer as claimed in claim 1, wherein the expansion units are respectively connected to several plugs disposed on one side of the module casing and several sockets are secured on the main circuit board for respectively connecting with the plugs.

* * * * *